Jan. 13, 1959  G. WINTRISS  2,867,942
WHISTLE WITH INTEGRAL ATTACHING MEANS
Filed April 15, 1953
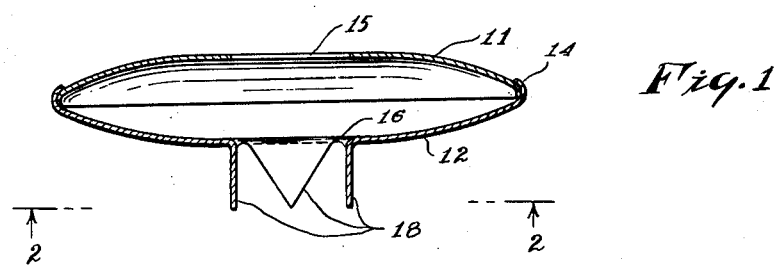
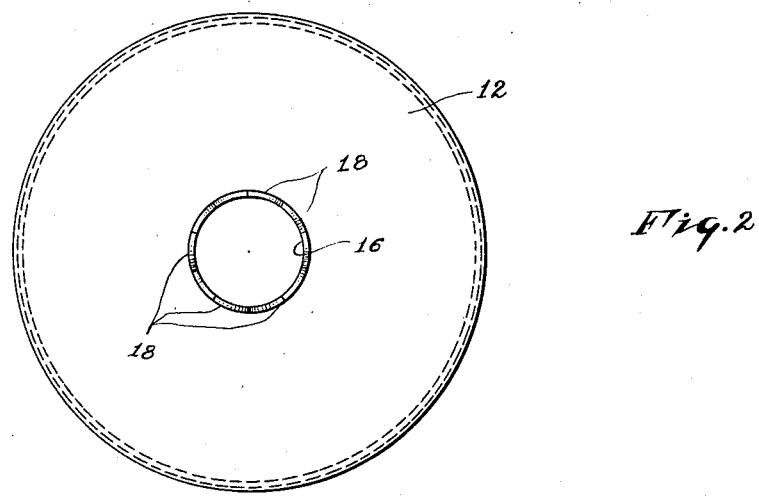
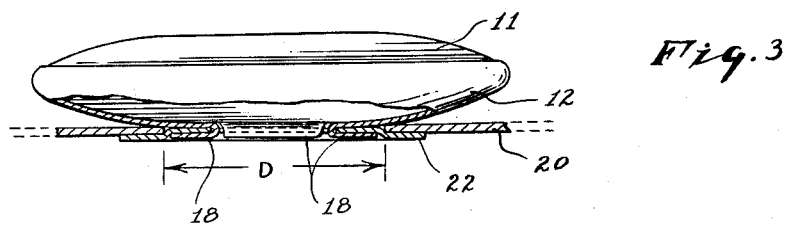
INVENTOR.
George Wintriss
BY Emery, Varney,
Whittemore & Dix.
ATTORNEYS

United States Patent Office 2,867,942
Patented Jan. 13, 1959

2,867,942

WHISTLE WITH INTEGRAL ATTACHING MEANS

George Wintriss, Carversville, Pa., assignor to Wintriss Inc., New York, N. Y., a corporation of New York Application April 15, 1953, Serial No. 349,020

7 Claims. (Cl. 46—175)

This invention relates to whistles such as are commonly used with hollow rubber toys, and the invention relates more particularly to a more economical construction for such whistles, and to a stronger connection between the whistle and the toy, or other device, with which the whistle is intended to be used.

It was the practice in the past to make such whistles with a fixed integral flange spaced from one side of the whistle by a distance substantially equal to the thickness of the wall to which the whistle was to be connected. The whistle was connected to the wall by stretching the edges around an opening in the wall to pass them over the flange; and the edges contracted into the space between the flange and the body of the whistle to hold the whistle in assembled relation with the wall. This construction had the serious disadvantage that the diameter of the flange had to be limited to the amount which the edges of the opening in the wall could be stretched in order to make the assembly. Whistles could be pulled out rather easily by children, and they constituted a hazard because they were small enough to be swallowed.

More recent constructions have attempted to overcome this disadvantage by making the whistle without a flange and then using an eyelet which could be placed on the opposite side of the wall from the whistle and connected to the whistle to clamp the whistle to the wall and form a flange which was too large for the edges of the wall opening to stretch over it. This construction has provided a permanent connection, but it has been more expensive and unless the eyelet is properly secured to the whistle, the reliability of the connection is lost.

It is an object of this invention to provide an improved whistle construction which is more economical to manufacture, and it is another object to provide such a construction with means for connecting a flange to the whistle after the flange and whistle have been brought into assembled relation with the wall of the toy, or other device, to which the whistle is to be connected.

The invention includes two shells which are dished and assembled with their concave sides confronting one another so as to enclose a chamber between them. Prongs extend from one of the shells and in the preferred construction these prongs are displaced from an opening through the center of the shell. The prongs can be passed through an opening in a wall, and through a washer, and then bent outwardly to clamp the washer against one side of the wall with the whistle clamped against the other side.

Other objects, features and advantages of the invention will appear or be pointed out as the description proceeds.

In the drawing, forming a part hereof, in which like reference characters indicate corresponding parts in all the views;

Figure 1 is a sectional view through a whistle embodying this invention,

Figure 2 is a view taken on the line 2—2 of Figure 1; and

Figure 3 is a view similar to Figure 1, but partly in elevation, and showing the whistle clamped to a wall by a washer which serves as a flange for clamping the wall.

The whistle shown in Figure 1 includes an upper shell 11 and a lower shell 12. Each of these shells is preferably made of malleable metal, such as sheet steel, and is dished with its peripheral portion curved, on a short radius, toward the other shell. The diameter of the lower shell 12 is slightly greater than the diameter of the upper shell 11 so that the peripheral portion of the upper shell fits into the peripheral portion of the lower shell. The parts are then secured together by rolling the peripheral edge portion 14 of the lower shell 12 over the sharply curved edge portion of the upper shell 11, as shown in Figure 1.

There is a center opening 15 in the shell 11 and a corresponding opening 16 in the shell 12. These openings, for the passage of air back and forth through the whistle, are in accordance with conventional construction for whistles of the character indicated. The openings 15 and 16 are in substantial alignment along what may be termed the "air flow axis" of the whistle.

The lower shell 12 has prongs 18 extending from its outer face. These prongs extend in directions generally parallel to the air flow axis of the whistle. The prongs 18 are of one-piece construction with the lower shell 12; and in the preferred construction, these prongs are made of metal displaced from the opening 16. This limits the length of the prongs to the radius of the opening 16, but with whistles of moderate size, the opening 16 is large enough to provide prongs 18 of ample length. Figure 1 shows the shell 11 provided with prongs 18 which have their junctures with the shell around the edges of the opening 16.

Figure 3 shows the way in which the whistle is secured to a wall 20 of a toy, or other device, with which the whistle is intended to be used. There is an opening through the wall 20 indicated by the dimension line D. A washer 22 is placed against the underside of the wall 20. This washer is preferably made with an inner annular portion offset from the outer part of the washer by a distance substantially equal to the thickness of the wall 20. When the washer is placed in position, this inner annular portion of the washer is located within the hole through the wall 20.

The prongs 18 are then inserted through the center opening of the washer 22, and the face of the shell 12, outside of the circle of prongs 18, is brought into contact with the washer 12. The prongs 18 are then bent outwardly against the outside face of the washer 22; and in the preferred construction, the inner, offset annular portion of the washer 22 has a width at least as great as the bent-over length of the prongs 18 so that the outer faces of the bent-over prongs 18 are flush, or substantially so, with the outer annular area of the washer 22.

This construction, shown in Figure 3, permits a maximum length of the prongs to be bent outwardly to hold the washer clamped against the whistle, and with the outer annular portion of the washer clamped against the wall 20. The invention can be used, however, with the wall 20 extending inwardly all the way to the prongs so that all of the area of the washer, confronting the whistle, is separated from the shell of the whistle by the portion of the wall clamped between the washer and the whistle.

Regardless of the way in which the wall is clamped between the washer 22 and the shell 12, it will be apparent that the washer 22 serves as a flange of large diameter overlapping a substantial area of the wall 20 beyond the opening through this wall.

The preferred construction has been illustrated and described, but changes and modifications can be made, and some features of the invention can be used in different combinations without departing from the invention as defined in the claims.

I claim as my invention:

1. A whistle including upper and lower metal shells enclosing a chamber and forming walls on opposite sides of the chamber with openings therethrough along an air flow axis of the whistle, said shells being dished and having their concave sides confronting one another, means connecting the shells around their outer edge portions, the outer surface of the lower shell around its air opening providing an abutment surface for contact with a wall of a toy, and metal prongs of one-piece construction with the lower shell and formed of metal displaced from said air opening of the lower shell, said prongs extending outwardly from the abutment surface for insertion through an opening in the wall of a toy and the prongs being of a length to be bent radially outward across the outside of the wall of the toy and spaced from said abutment surface when the abutment surface is against the inside of the wall of the toy.

2. A whistle comprising two dished walls with concave surfaces confronting one another and connected together around their peripheries to enclose a chamber and with openings through the walls for the passage of air to produce the whistle sound, prongs extending from the front wall and of one-piece construction with the front wall, said prongs extending generally normal to the adjacent surface of the front wall and being displaced from and located around the air passage opening through the front wall from which they extend, the prongs being of malleable material and adapted to be bent outwardly, after passing through a hole in a wall of a toy, and into positions where the prongs are generally parallel to said front face for clamping the whistle against one side of the wall of the toy with the prongs extending across areas of the other side of said wall of the toy and with the opening through the front wall of the toy in substantial alignment with said opening in the wall of the toy.

3. A whistle including shells of dished contour with their peripheral edges connected and their concave sides confronting one another so that the shells enclose a chamber, the walls on opposite sides of the chamber having openings therethrough for the passage of air to produce the whistle sound, prongs extending from the outside face of one of the shells, said prongs being of one-piece construction with the shell and made of material displaced from the air passage opening through the shell and having their junctures with the shell around the edge of said air passage opening, and a washer adjacent to the outside of the shell from which the prongs extend, said washer having an opening therein through which the prongs extend and beyond which the prongs are bent outwardly to clamp a wall of a toy or other device between the washer and the face of the whistle from which the prongs extend.

4. A whistle including shells constructed of malleable metal and shaped to extend toward one another to enclose a chamber between them with opposite and spaced sides of the chamber having openings therethrough for the passage of air to produce the whistle sound, means joining the shells with one another around their peripheral edges, prongs extending from one of the shells in the direction of the air flow axis of the chamber, said prongs being of one-piece construction with that shell and made of material displaced from the air passage opening through that shell and having their junctures with the shell around the edges of said air passage opening.

5. A whistle including two complementary shells of malleable metal and with their concave faces confronting one another so as to enclose a chamber between them, each of the shells having a central opening therein for the passage of air to produce the whistle sound and each of said shells having its peripheral edge portion in contact with the peripheral edge portion of the other shell, the shells being connected with one another by a rolled-over edge of one shell extending around the peripheral edge portion of the other shell, prongs extending outwardly from the face of one shell in directions generally parallel to the axis of the chamber, said prongs being of one-piece construction with the shell and made of material displaced from the center air passage opening through that shell and having their junctures with the shell around the periphery of the air passage opening from which they are displaced.

6. The combination with the wall of a toy having an opening therethrough, of a whistle comprising upper and lower shells, each of which is dished and has its concave face confronting the other shell so as to enclose a chamber with spaced side walls, said walls having openings therethrough for the passage of air to produce the whistle sound, means connecting the shells with one another around their peripheral edge portions, the outer surface of the lower shell around its air passage opening being in contact with the inside surface of the wall of the toy, prongs extending from the outside face of the lower shell at regions spaced around the air passage opening through that shell, the prongs consisting of portions of the shell which were displaced to make said air passage opening in the shell, the prongs extending through an air passage in the wall of the toy and being longer than the thickness of the wall of the toy, and a washer in contact with the outside of the wall of the toy and having an opening therein through which the prongs extend and beyond which the prongs are bent outwardly to clamp the wall of a toy between the washer and the lower shell from which the prongs extend.

7. The combination described in claim 6 and in which the washer has an inner annular area offset toward the whistle and a radial width at least as great as the length of the bent-over portions of the prongs, the extent of the inward offset of the washer being at least as great as the thickness of the prongs so that the outer surfaces of the bent-over prongs are no higher than a location flush with the outer area of the washer beyond the offset annular portion.

References Cited in the file of this patent

UNITED STATES PATENTS

| | | |
|---|---|---|
| 247,088 | Maynz | Sept. 13, 1881 |
| 589,500 | Freeman | Sept. 7, 1897 |
| 629,754 | Popham | July 25, 1899 |
| 847,240 | Chamberlain | Mar. 12, 1907 |
| 940,128 | Childs | Nov. 16, 1909 |
| 1,073,494 | Jackson | Sept. 16, 1913 |
| 1,824,317 | Wilhelm | Sept. 22, 1931 |
| 2,616,217 | Wild | Nov. 4, 1952 |

FOREIGN PATENTS

| | | |
|---|---|---|
| 608,084 | France | Dec. 18, 1925 |